(12) United States Patent
Zhang et al.

(10) Patent No.: US 8,149,840 B2
(45) Date of Patent: Apr. 3, 2012

(54) METHOD, SYSTEM AND PROCESSOR FOR PROCESSING NETWORK ADDRESS TRANSLATION SERVICE

(75) Inventors: Rihua Zhang, Shenzhen (CN); Zhiqiang Zhu, Shenzhen (CN); Guibin Hou, Shenzhen (CN); Xiangdong Meng, Shenzhen (CN); Shifeng Mao, Shenzhen (CN); Rong He, Shenzhen (CN); Wenhui Xie, Shenzhen (CN); Yuzhu Chen, Shenzhen (CN); Ran Su, Shenzhen (CN); Yong Xu, Shenzhen (CN); Zhijun Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 176 days.

(21) Appl. No.: 12/469,359

(22) Filed: May 20, 2009

(65) Prior Publication Data

US 2009/0296706 A1    Dec. 3, 2009

(30) Foreign Application Priority Data

Jun. 2, 2008   (CN) .......................... 2008 1 0114418
Mar. 9, 2009   (WO) ................. PCT/CN2009/070703

(51) Int. Cl.
    *H04L 12/28*    (2006.01)
(52) U.S. Cl. .................... 370/392; 370/400; 370/466
(58) Field of Classification Search ................. 370/229, 370/230, 230.1, 231, 235, 254, 351, 352, 370/389, 392, 395.53, 400, 401, 468
See application file for complete search history.

(56) References Cited

U.S. PATENT DOCUMENTS

| 7,139,841 | B1 | 11/2006 | Somasundaram et al. |
| 7,334,049 | B1* | 2/2008 | Somasundaram et al. ..... 709/245 |
| 2004/0148326 | A1* | 7/2004 | Nadgir et al. ................. 709/200 |
| 2004/0193677 | A1 | 9/2004 | Dar et al. |
| 2004/0215752 | A1 | 10/2004 | Satapati et al. |
| 2006/0218273 | A1* | 9/2006 | Melvin ......................... 709/224 |
| 2008/0165802 | A1 | 7/2008 | Tang |

FOREIGN PATENT DOCUMENTS

| CN | 1754374 A | 3/2006 |
| CN | 1825828 A | 8/2006 |
| CN | 101047548 A | 10/2007 |
| CN | 101136926 A | 3/2008 |
| CN | 101141494 A | 3/2008 |

OTHER PUBLICATIONS

State Intellectual Property Office of the People's Republic of China, Examination Report in Chinese Patent Application No. 200810114418.X (Apr. 14, 2010).
$2^{nd}$ Office Action in corresponding Chinese Application No. 200810114418.X (Feb. 23, 2011).

(Continued)

*Primary Examiner* — Jung Park
(74) *Attorney, Agent, or Firm* — Leydig, Voit & Mayer, Ltd.

(57) ABSTRACT

A method, a system, and a processor for processing a network address translation (NAT) service are provided. The method includes: performing NAT service identification of a received message, and selecting a corresponding NAT service processor for processing a NAT service of a message that needs a NAT service processing from at least two NAT service processors. Through embodiments of the disclosure, a demand for the system to process a lot of NAT services within a short time is fulfilled, so as to increase the capacity of processing NAT services of the system.

14 Claims, 6 Drawing Sheets

OTHER PUBLICATIONS

Written Opinion of the International Searching Authority in corresponding PCT Application No. PCT/CN2009/070703 (Jun. 18, 2009).

Rejection Decision in corresponding Chinese Application No. 200810114418.X (Jul. 15, 2011).

* cited by examiner

METHOD, SYSTEM AND PROCESSOR FOR PROCESSING NETWORK ADDRESS TRANSLATION SERVICE

CROSS-REFERENCE TO RELATED APPLICATIONS

This application claims the priority to Chinese patent application No. 200810114418.X, filed on Jun. 2, 2008, and International Application No. PCT/CN2009/070703, filed on Mar. 9, 2009. The contents of the above identified applications are incorporated herein by reference in their entireties.

FIELD OF THE TECHNOLOGY

Embodiments of the disclosure relate to a technology of computer networks, and more particularly to a method, a system, and a processor for processing a network address translation (NAT) service.

BACKGROUND

With the development of the Internet, shortage of IP addresses has become an increasingly severe problem. At present, a NAT technology is a principal method to solve this problem. The NAT is a technology that translates a private network address into a public network address. In a local area network, each internal node occupies one internal address (that is, an address inside the local area network, which is also referred to a private network address). When the internal node needs to communicate with an external network, the internal address that the internal node occupies may be translated into a public network address by the NAT technology, thereby realizing normal communication between the internal node in the local area network and the external network. Thus, by the NAT technology, multiple computers could share one public network address (IP address), so as to solve the problem of shortage of public IP addresses.

The internal address is used inside the local area network. In other words, a private network address may not be assigned in the Internet (i.e. the public network). The private network addresses include:

10.0.0.0~10.255.255.255
172.16.0.0~172.31.255.255
192.168.0.0~192.168.255.255

The public network addresses include:

0.0.0.0~126.255.255.255
128.0.0.0~191.255.255.255
192.0.0.0~223.255.255.255

In practical application, each corporation or organization may select suitable private network addresses according to a number of hosts. Private network addresses used by different corporations or organizations may be identical, or different.

FIG. 1 is a schematic diagram of realizing a NAT service in the prior art. In a computer network as shown in FIG. 1, network addresses used inside one local area network are in the network segment 10.0.0.0, and an external public network address is 202.196.3.23. When a host with an internal network address 10.1.1.48 inside the local area network needs to access a server with an address 202.18.245.251 outside the local area network in a www manner, the host with the network address 10.1.1.48 sends a message. A source port of the message is 6084, a destination port thereof is 80. When the message passes a router, the router translates a source address and the source port of the message to 202.196.3.23:32814 through the NAT technology, and then the message is forwarded without changing a destination address and the destination port. When the server in the external network returns a result, the router may translate a destination IP address and a port of the result message to 10.1.1.48:6084, thereby realizing communication between the host inside the local area network and the server outside the local area network.

During the routing, the router may produce a NAT forwarding entry. The forwarding entry that includes an address and a port number before the NAT translation and an address and a port number after the NAT translation. The forwarding entry is produced during the NAT translation. The forwarding entry in the example may be as follows:

before translation: 10.1.1.48:6084<------------> after the translation: 202.196.3.23:32814.

That is, a source address 10.1.1.48 of the message is changed into 202.196.3.23, and a port number 6084 is changed into 32814. When the router receives a message with a destination address 202.196.3.23 and a port number 32814 from the outside, a destination address of the message is changed into 10.1.1.48, and the port number thereof is changed into 6084.

When a lot of NAT services need to be processed within a short time, the capacity of processing NET services may be decreased and network resources may be wasted.

SUMMARY

A method for processing a NAT service includes performing NAT service identification of a received message, and selecting a corresponding NAT service processor for processing a NAT service of the message that needs a NAT service processing from at least two NAT service processors.

A message transceiver processor includes:

a NAT service identification unit, adapted to perform NAT service identification on a received message and determine a message that needs a NAT service processing; and a processing unit, adapted to select a corresponding NAT service processor for processing a NAT service of the message that needs the NAT service processing determined by the NAT service identification unit from at least two NAT service processors.

A system for processing a NAT service includes:

at least two NAT service processors, adapted to perform a NAT service processing on a message; and a message transceiver processor, adapted to perform NAT service identification on a received message, and select a corresponding NAT service processor for processing a NAT service of the message that needs the NAT service processing from the at least two NAT service processors.

BRIEF DESCRIPTION OF THE DRAWINGS

The disclosure or the prior art may be more fully understood from the detailed description given herein below for illustration only. It will be apparent to those skilled in the art that other drawings of the disclosure may be easily conceived according to the drawings given herein.

DETAILED DESCRIPTION

The technical solutions in embodiments of the disclosure are described clearly and completely as follows by reference to the accompanying drawings in the embodiments of the disclosure. Apparently, the described embodiments are only a part of embodiments of the disclosure, rather than all the embodiments. Based on the embodiments of the disclosure, all the other embodiments obtained by those of ordinary skill in the art without carrying out creative activities should fall within the scope of the technical solution.

In an embodiment of the disclosure, in order to increase the capacity of processing NAT services of a system and avoid the waste of network resources, a processing solution of NAT services is provided. In other words, distributed processing is performed on the NAT services in a distributed system. Specifically, after NAT service identification of a received message, a corresponding NAT service processor is selected from at least two NAT service processors for a message that needs the NAT service processing. The corresponding NAT service processor performs the NAT service processing on the message, thereby increasing the capacity of the system for processing the NAT services.

Each of the NAT service processors corresponds to at least one public network address, and the public network addresses corresponding to each of the NAT service processors are different.

Specifically, the processing solution of NAT services also includes configuring a NAT service processor for each node inside a local area network according to at least one configuration policy, so as to process a NAT service of a message of the node.

Further, the step that a message transceiver processor configures the NAT service processor for each node inside the local area network according to the at least one configuration policy includes generating a routing table that stores the NAT service processor information (such as an address or a number of the NAT service processor) that processes a NAT service of a message of the each node.

During the above processing, the transceiver processor performs the NAT service identification on the received message, so as to ensure that forward and reverse messages of a same flow (that is, a data flow between an internal network node and an external network device) are centralized and processed by the same NAT service processor.

In order to make the embodiments of the disclosure more comprehensible, embodiments of the disclosure are described in detail in the following with reference to the accompanying drawings.

Figure 1:
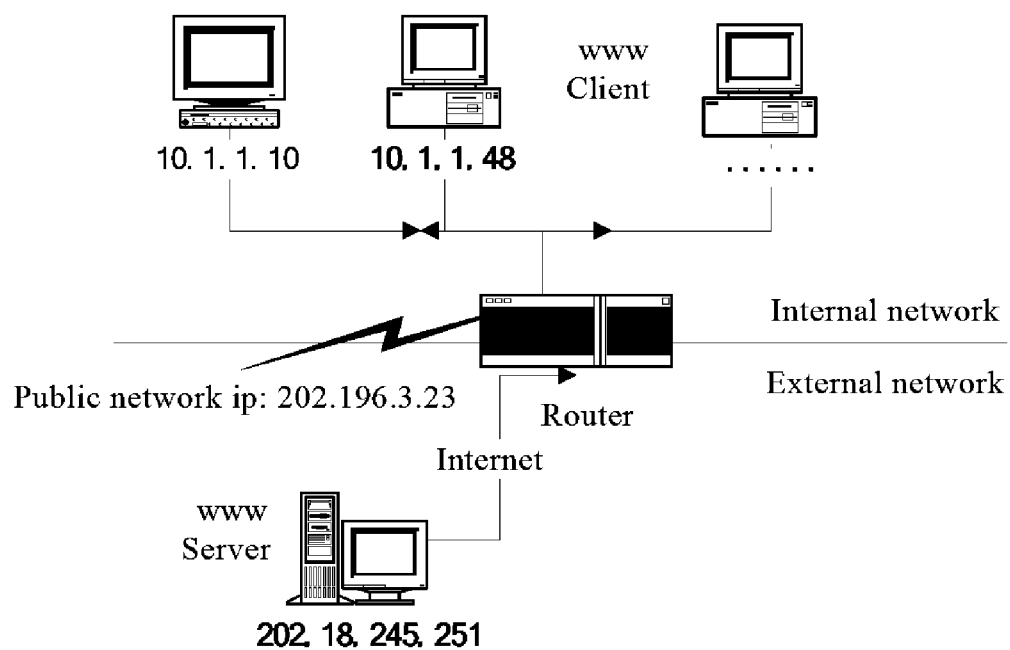
FIG. 1 is a schematic diagram of realizing a NAT service in the prior art.
Figure 2:
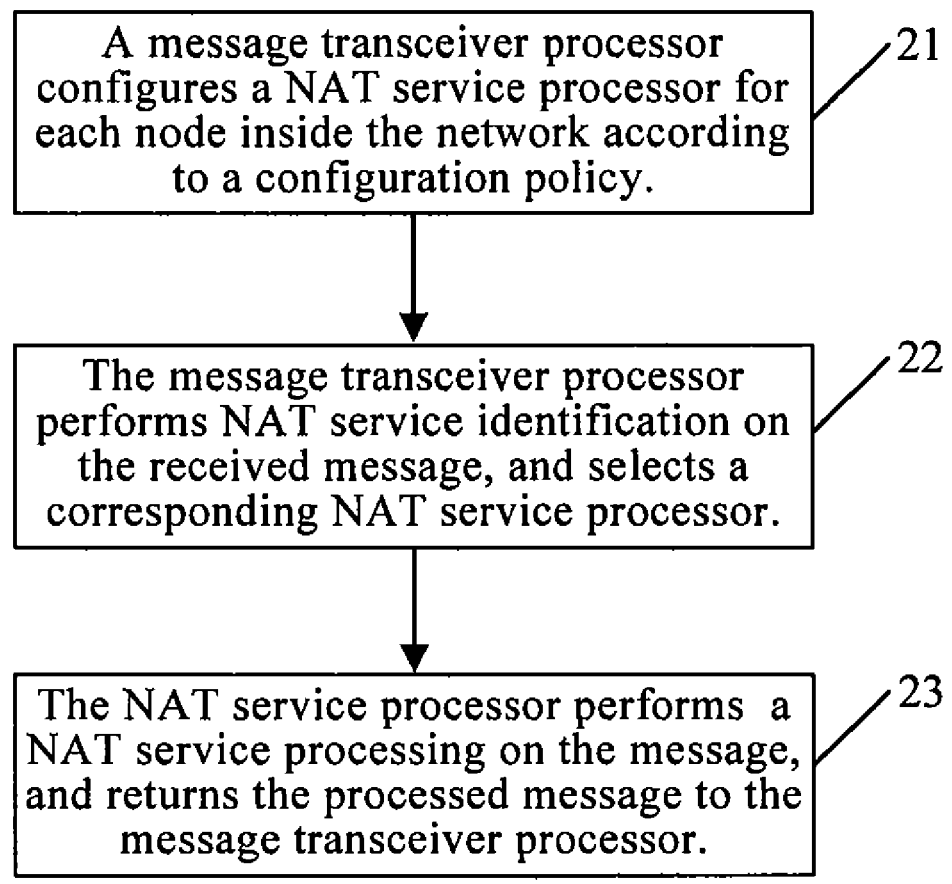
FIG. 2 is a schematic flow chart of a method according to an embodiment of the disclosure.

FIG. 2 is a schematic flow chart of a method according to an embodiment of the disclosure. The method according to the embodiment of the disclosure is described in the following in detail with reference to FIG. 2. As shown in FIG. 2, the method includes the blocks as: follows.

In Block 21, a message transceiver processor configures a NAT service processor for each internal network node according to at least one configuration policy, that the NAT service processor of each internal network may process a NAT service of a message of each internal network node. Also, the message transceiver processor stores a routing table generated during the configuration process. The routing table stores the NAT service processor information (such as the address or the number of the NAT service processor) that processes the NAT service of the message of each node. In other words, the NAT service processor that processes the NAT service of the message of the each node is found by the routing table. During the above process, the configuration policy and the routing table may be delivered into each message transceiver processor.

In a specific implementation process, the configuration policy may be a policy of configuration in accordance with an internal network address of the node inside the local area network, or may be a policy of configuration in accordance with a port number of the node inside the local area network, or may be a policy of configuration in accordance with other identifiers of the node in the local area network. Thus, a plurality of configuration policies may exist in the embodiments of the disclosure. If the configuration policy is configuring in accordance with an internal network address of each node, during the configuration, each address pool (including internal network addresses of a plurality of inter network nodes) is bound to a corresponding NAT service processor, and all the NAT services related to the addresses in the address pool are processed by the NAT service processor. If the configuration policy is configuring in accordance with a port number or other identifiers of the each node, the principles of processing are similar to the above.

In Block 22, after receiving a message, the message transceiver processor performs the NAT service identification of the message and selects a corresponding NAT service processor (that is a NAT service processor for processing related NAT service of the message). Block 22 includes judging whether the message received by the message transceiver processor needs the NAT service processing or not, and if the message received by the message transceiver does not need the NAT service processing, other processings are performed on the received message; if the message received by the message transceiver need the NAT service processing, the corresponding NAT service processor is selected to perform the NAT service processing on the message. In practical implementation, the Block 22 may include Step A and/or Step B (not shown in FIG. 2).

In Step A, if a forward flow message sent from a local area network to a public network is received, a corresponding configuration policy is searched in accordance with information of the message. The address or the number of the corresponding NAT service processor is searched in accordance with the found configuration policy. For example, when the configuration policy is in accordance with the internal network address of a node, the address or the number of the corresponding NAT service processor is searched in accordance with information of the forward flow message. The information of the forward flow message includes information of the source node that sends the message, and the like. The forward flow message is sent to the NAT service processor after the corresponding NAT service processor is determined.

In Step B, if a reverse flow message sent from the public network to the local area network, a NAT service processor corresponding to a destination address (each NAT service processor has a corresponding public network address) is searched from the routing table generated during the configuration according to the destination address of the reverse flow message (at this time, the destination address is a public network address). The reverse flow message is sent to the NAT service processor after the corresponding NAT service processor is determined.

In Block 23, the NAT service processor performs the NAT service processing on a message, and returns the message after the NAT service processing to the message transceiver processor. The message transceiver processor sends the message. Specifically, Block 23 may include Step C and/or Step D (not shown in FIG. 2).

In Step C, the NAT service processing is performed on the forward flow message. For example, when a source address of the received forward flow message is an address in the address pool that is bound to the NAT service processing, an internal network addresses and a port number of the forward flow message are translated into a public network address and a port number corresponding to the NAT service processor. Then, the message after the NAT service processing is returned to the message transceiver processor, and the message transceiver processor sends the message.

In Step D, the NAT service processing is performed on the reverse flow message. For example, a destination address and a port number of the reverse flow message are translated into an internal network address and a port number. Then the message after the NAT service processing is returned to the message transceiver processor, and then the message transceiver processor sends the message.

The configuration policy in the embodiments of the disclosure may be in accordance with identifiers of the network node such as an internal network address, a port number, or a MAC address. Therefore, the configuration policy in the embodiments of the disclosure includes a plurality of policies. The message transceiver processor may configure a node inside the system according to various policies at the same time. Therefore, each NAT service processor is bound to several address pools obtained according to different configuration policies. Each message transceiver processor stores various configuration policies and routing tables generated during the configuration according to various configuration policies. When transceiving the messages, each message transceiver processor may perform processing according to the stored configuration policies and routing tables.

Compared with the prior art where a NAT service is accomplished by an overall system, in the embodiments of the disclosure, a NAT service is accomplished by distributed processing in a distributed system, in other words, a NAT service is processed by at least one message transceiver processor and at least two NAT service processors in the system. Thus, a demand for the system to process a lot of NAT services within a short time is fulfilled, and effectively increasing the capacity of processing the NAT services of the system.

Processing of the message transceiver processor and the NAT service processor according to the embodiments of the disclosure is described in detailed in the following, respectively.

Figure 3:
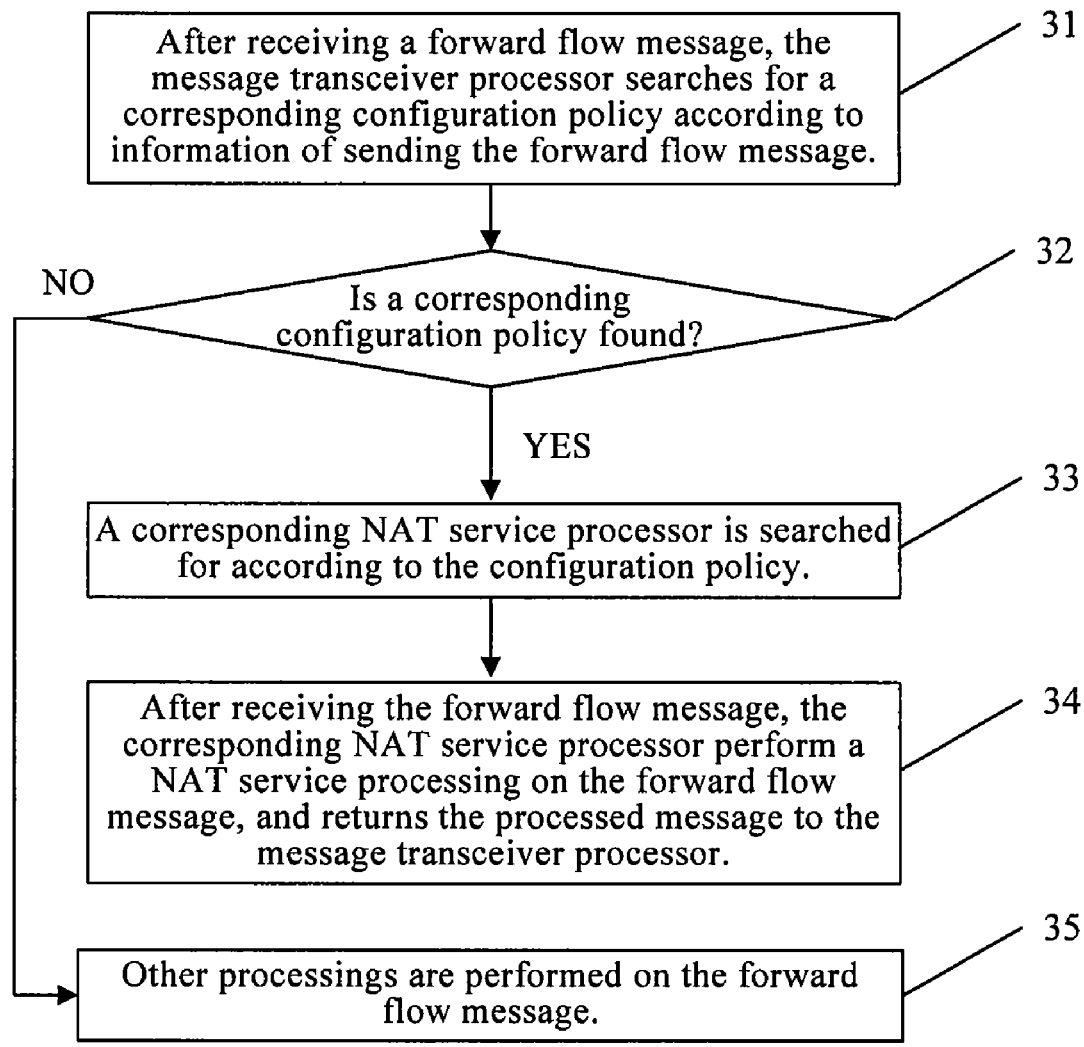
FIG. 3 is a flow chart of a method for processing a NAT service of a forward flow message according to an embodiment of the disclosure.

FIG. 3 is a flow chart of a method for processing NAT services of a forward flow message according to an embodiment of the disclosure. Before the following processing of the NAT service of the forward flow message, the message transceiver processor has already configured a corresponding NAT service processor for each node according to a configuration policy, and generated a routing table that stores the address or the number of the NAT service processor that processes the NAT service of the message of the each node. As shown in FIG. 3, the process of processing the NAT services of the forward flow message in an embodiment of the disclosure may include the following steps.

In Block 31, after receiving a forward flow message sent from a local area network to a public network, the message transceiver processor searches for a corresponding configuration policy according to information of the forward flow message. For example, in practical implementation, the message transceiver processor searches for a corresponding configuration policy according to information of the message such as a source address.

In Block 32, if a corresponding configuration policy is found, the process proceeds to Block 33. If no corresponding configuration policy is found, the process proceeds to Block 35.

In Block 33, the address or the number of a corresponding NAT service processor is searched in accordance with the configuration policy. For example, in practical implementation, if the configuration policy is in accordance with an address of the node, it is searched in accordance with the configuration policy whether a source address of the forward flow message (that is, an address of a source node that sends the message) belongs to an address pool or not. If the source address belongs to an address pool, the NAT service processor that is bound to the address pool is the corresponding NAT service processor. Then the message is sent to the corresponding NAT service processor. The process proceeds to Block 34.

In Block 34, after receiving the forward flow message, the corresponding NAT service processor performs the NAT service processing on the forward flow message. In practical implementation, an internal network address of the forward flow message is modified to a public network address corresponding to the NAT service processor (that is, an external public network address of the system), and the port number or other identifiers of the internal network are modified correspondingly. Then a forwarding entry is generated and stored. Then, the message processed by the NAT service is returned to the message transceiver processor. The message transceiver processor sends the message. This flow ends.

In Block 35, other processings are performed on the forward flow message. This flow ends.

Figure 4:
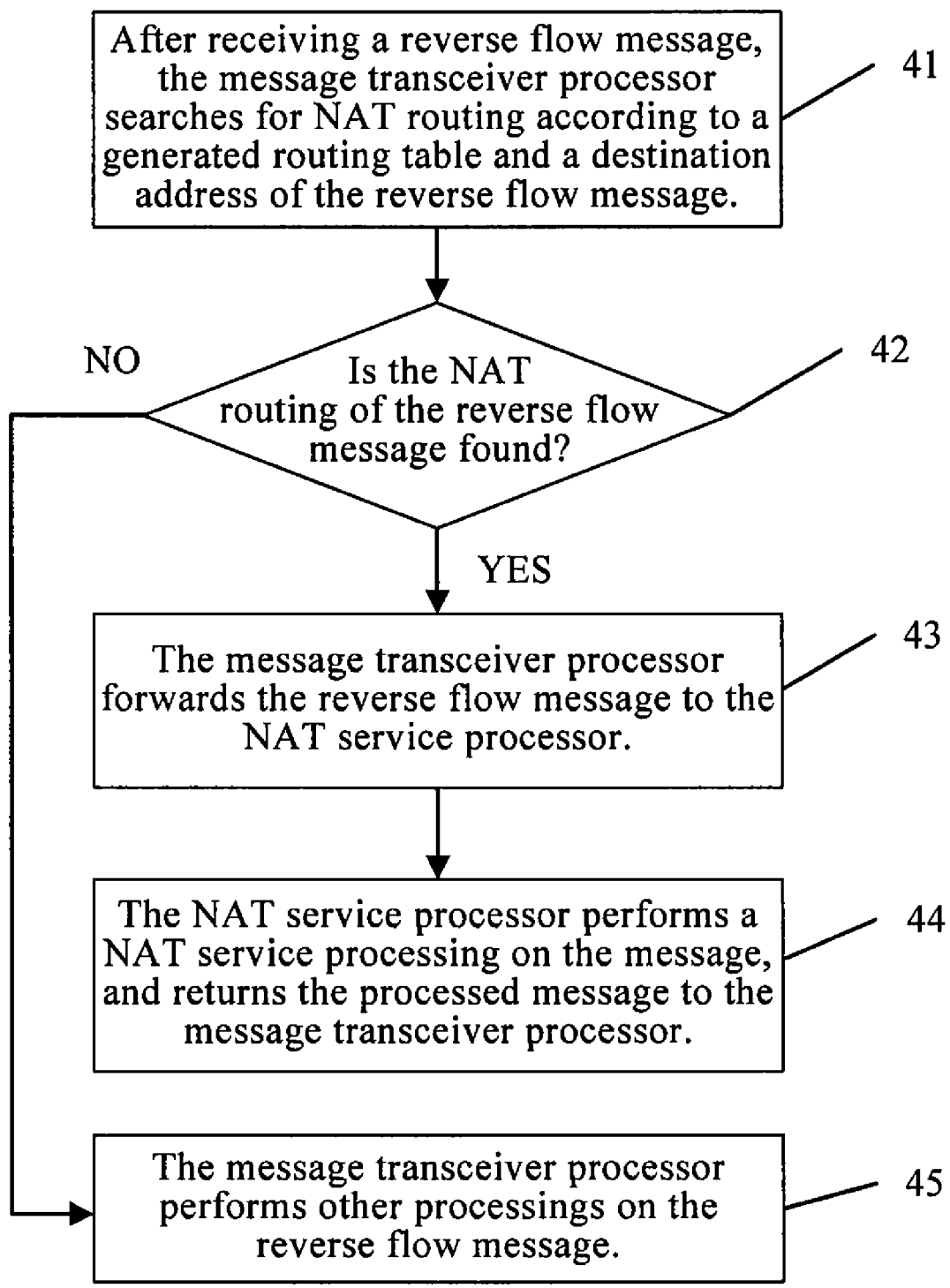
FIG. 4 is a flow chart of a method for processing a NAT service of a reverse flow message according to an embodiment of the disclosure.

FIG. 4 is a flow chart of a method for performing a NAT service of a reverse flow message according to an embodiment of the disclosure. Before the processing of the NAT service of the reverse flow message in the following, the message transceiver processor has configured a corresponding NAT service processor for each node according to a configuration policy, and generated and stored a routing table of the address or the number of the NAT service processor that processes the NAT service of the message of each node. As shown in FIG. 4, the process of processing the NAT service of the reverse flow message according to an embodiment of the disclosure includes:

In Block 41, after receiving a reverse flow message sent from a public network to a local area network, the message transceiver processor may search for NAT routing according to the generated routing table and the destination address of the reverse flow message, that is, search for a NAT service processor corresponding to a destination address of the reverse flow message. In practical implementation, a plurality of NAT service processors may exist in the system, and each NAT service processor corresponds to one (or more, of course) public network address. For example, three NAT service processors exist in the system, and the external network addresses (that is, the public network addresses) are 202.18.245.1, 202.18.245.2, and 202.18.245.3, respectively. When receiving the reverse flow message with the destination address 202.18.245.2, the message transceiver processor searches for a NAT service processor corresponding to the address 202.18.245.2.

In Block 42, if the NAT routing of the reverse flow message is found, in other words, the NAT service processor corresponding to the destination address of the reverse flow message is found, the process proceeds to Block 43. If no NAT routing is found, the process proceeds to Block 45.

In Block 43, the message transceiver processor forwards the reverse flow message to the NAT service processor recorded in the routing table.

In Block 44, after receiving the message, the NAT service processor corresponding to the destination address of the message performs the NAT service processing on the message. For example, in the practical implementation, a related NAT forwarding entry generated during the NAT service processing before is searched for. The destination address of the message is translated to an internal network addresses, a port number of the destination node according to the forwarding entry. Then, the message undergoing the NAT service processing is returned to the message transceiver processor. The message transceiver processor sends the message. This flow ends.

In Block 45, the message transceiver processor performs other processings on the reverse flow message. This flow ends.

Processes of respective NAT service processing on the forward flow message and the reverse flow message according to the embodiments of the disclosure are described above. It can be seen that each message transceiver processor may receive a message from an external network, or receive a message from an internal network. Each message transceiver processor may assign a message that needs a NAT service processing to each NAT service processor according to a configuration policy. During the NAT service processing, each NAT service processor produces a forwarding entry. In the embodiments of the disclosure, the NAT service processors also accomplish some NAT functions of specific application by assistance, such as mutual data backup.

Figure 5:
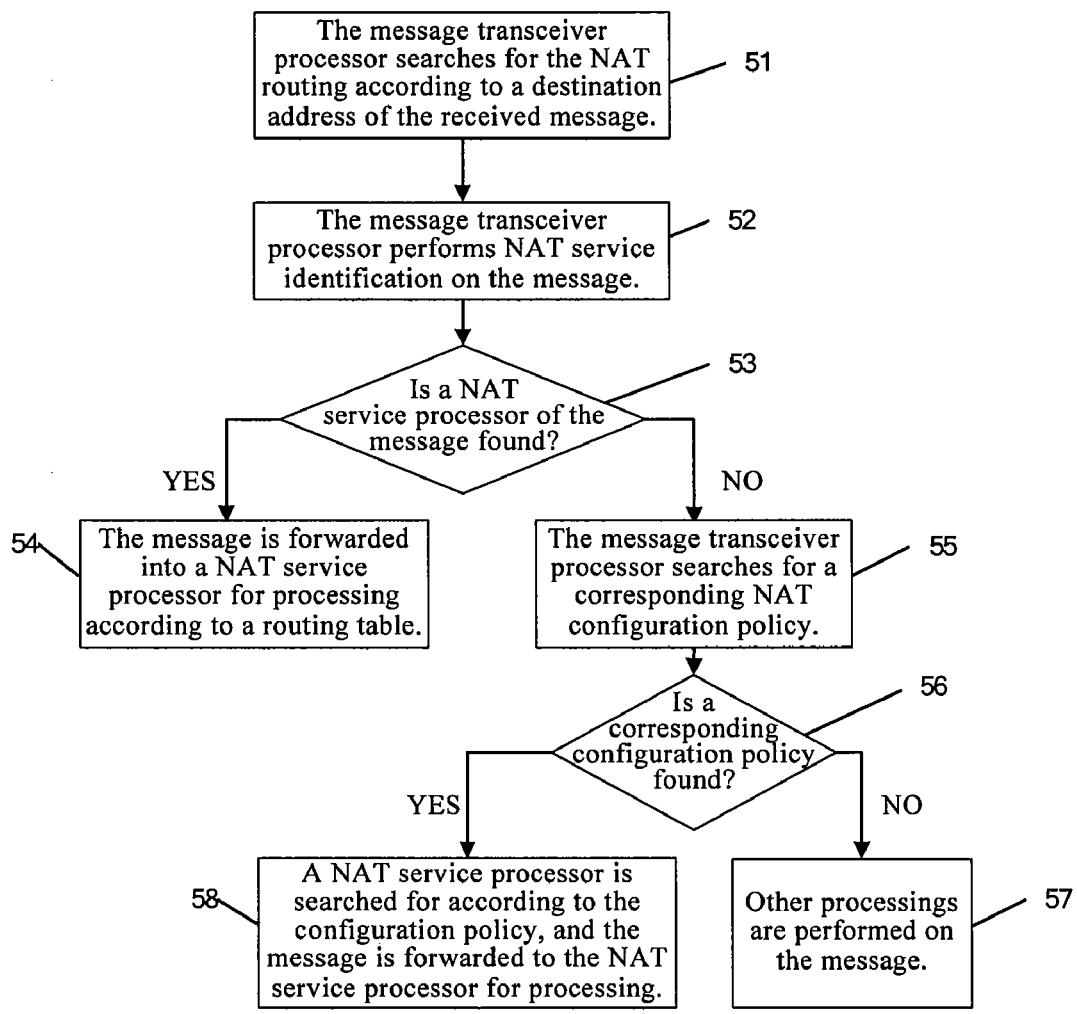
FIG. 5 is a schematic diagram of processing of a specific application process according to an embodiment of the disclosure.

FIG. 5 is a schematic diagram of processing of a specific application process according to an embodiment of the disclosure. The specific application process according to an embodiment of the disclosure is described below in detailed with reference to FIG. 5. As shown in FIG. 5, the corresponding specific process includes:

In Block 51, the message transceiver processor searches for the NAT routing according to a destination address of a received message. The message may be from an external network (that is, the destination address of the message is an external network address and port number of the system, i.e. a public network address and port number), or may also be from an internal network (that is, a source address and port number of the message is an internal network address and port number).

In Block 52, the message transceiver processor performs the NAT service identification on the received message. The NAT service identification includes judging whether the message needs the NAT service processing or not, and if the message needs the NAT service processing, the process proceeds to Block 53; otherwise, other processings are performed on the message.

For example, three NAT service processors exist in the system, and the external network addresses are 202.18.245.1, 202.18.245.2, and 202.18.245.3, respectively. When receiving a message with a destination address of 202.18.245.2, the message transceiver processor searches for a NAT service processor corresponding to the address 202.18.245.2.

In Block 53, if the NAT service processor corresponding to the destination address of the message is found, the message is a reverse flow message, and the process proceeds to Block 54. If no NAT service processor is found, the process proceeds to Block 55.

In Block 54, the message is forwarded to the NAT service processor corresponding to a destination address of the message according to a routing table generated during the configuration. The NAT service processor performs the NAT service processing on the message. For example, in the practical implementation, the NAT service processor may search for a related NAT forwarding entry generated during the NAT service processing before. The destination address of the message is translated into an internal network address and a port number of a destination node according to the forwarding entry. Then the message undergoing the NAT service processor is returned to the message transceiver processor, and the message transceiver processor sends the message. This flow ends.

In Block 55, the message transceiver processor searches for a corresponding NAT configuration policy, in other words, the message transceiver processor searches for a corresponding configuration policy according to information of the message.

In Block 56, if a corresponding configuration policy is found, the message is a forward flow message, and the process proceeds to Block 58. If no corresponding configuration policy is found, the process proceeds to Block 57.

In Block 57, other processings are performed on the message. This flow ends.

In Block 58, the address or the number of a corresponding NAT service processor is searched in accordance with configuration policy. The message is sent to the NAT service processor for processing. The NAT service processor performs the NAT service processing on the message. For example, an internal network address of the message is modified to an external IP address of the system, and a port number or other identifiers are modified correspondingly. The message processed by the NAT service processor is then returned to the message transceiver processor. The message transceiver processor sends the message. This flow ends.

In the descriptions above, it is determined whether a received message is a reverse flow message, and then it is determined whether the received message is a forward flow message. In the practical application, it may also be determined whether the message is a forward flow message first, and then it is determined whether the message is a reverse flow message.

A lot of NAT service processing tasks in the system may be shared by a plurality of NAT service processors, thereby avoiding that too many NAT services are centralized at one processor for processing and cause a decrease of capacity of processing NET services of the overall system and waste of network resources. Thus, in the embodiments of the disclosure, a distributed processing manner in a distributed system is adopted to effectively increase the capacity of processing NAT services of the system.

Figure 6:
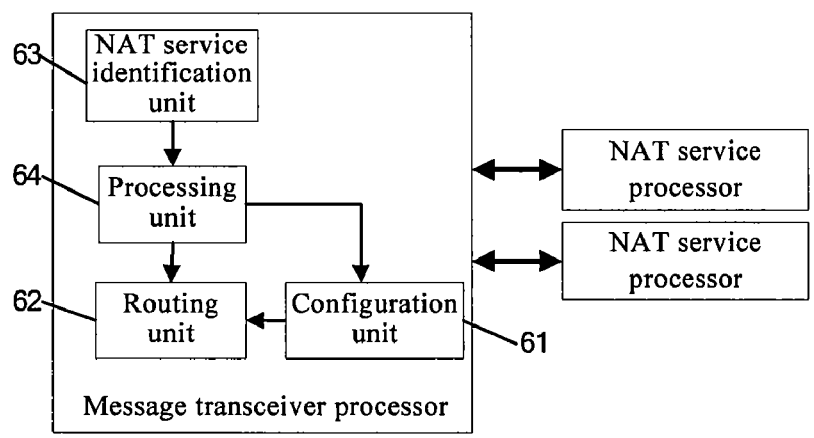
FIG. 6 is a schematic structural diagram of a message transceiver processor according to an embodiment of the disclosure.

In an embodiment of the disclosure, a message transceiver processor is further provided. The message transceiver processor is adapted to perform the NAT service identification on a received message, select a corresponding NAT service processor for processing a NAT service of a message that needs NAT service processing from at least two NAT service processors, and send the message processed by the corresponding NAT service processor. FIG. 6 is a schematic structural diagram of a message transceiver processor according to an embodiment of the disclosure. As shown in FIG. 6, the message transceiver processor includes a configuring unit 61, a routing unit 62, a NAT service identification unit 63, and a processing unit 64.

The configuration unit 61 is adapted to store configuration policies, and configure a NAT service processor for each node inside the network according to at least one configuration policy.

The routing unit 62 is adapted to store a routing table generated when the configuration unit 61 configures a NAT service processor for the each node inside the network. The routing table stores the address or the number of the NAT service processor that processes a NAT service of a message of the node.

The NAT service identification unit 63 is adapted to perform NAT service identification on the received message. In this embodiment, the NAT service identification unit 63 determines whether the received message needs NAT service processing, and sends the determination result to the processing unit 64.

The processing unit 64 is adapted to select a corresponding NAT service processor for processing a NAT service of a message that needs NAT service processing determined by the NAT service identification unit 63 from at least two NAT service processors. In this embodiment, when a message received by the NAT service identification unit 63 is a forward flow message and it is determined that the forward flow message needs the NAT service processing, the processing unit 64 searches for a corresponding configuration policy in the configuration unit 61 according to information for sending the message, searches for the address or the number of the corresponding NAT service processor from the routing unit 62 according to the configuration policy, and sends the received message to a NAT service processor corresponding to the address or the number. Or, when a message received by the NAT service identification unit 63 is a reverse flow message and it is determined that the reverse flow message needs the NAT service processing, the processing unit 64 searches for the address or the number of a corresponding NAT service processor from a routing table stored in the routing unit 62 according to information of a destination address of the reverse flow message, and sends the received message to a NAT service processor corresponding to the address or the number.

Further, the processing unit 64 is also adapted to send the processed message returned by the corresponding NAT service processor, or performing other processing on the received message that does not need the NAT service processing.

Optionally, the message transceiver processor may further include a delivery unit. The delivery unit is adapted to deliver a configuration policy in the configuration unit 61 and a routing table generated by the routing unit 62 to other message transceiver processors.

Figure 7:
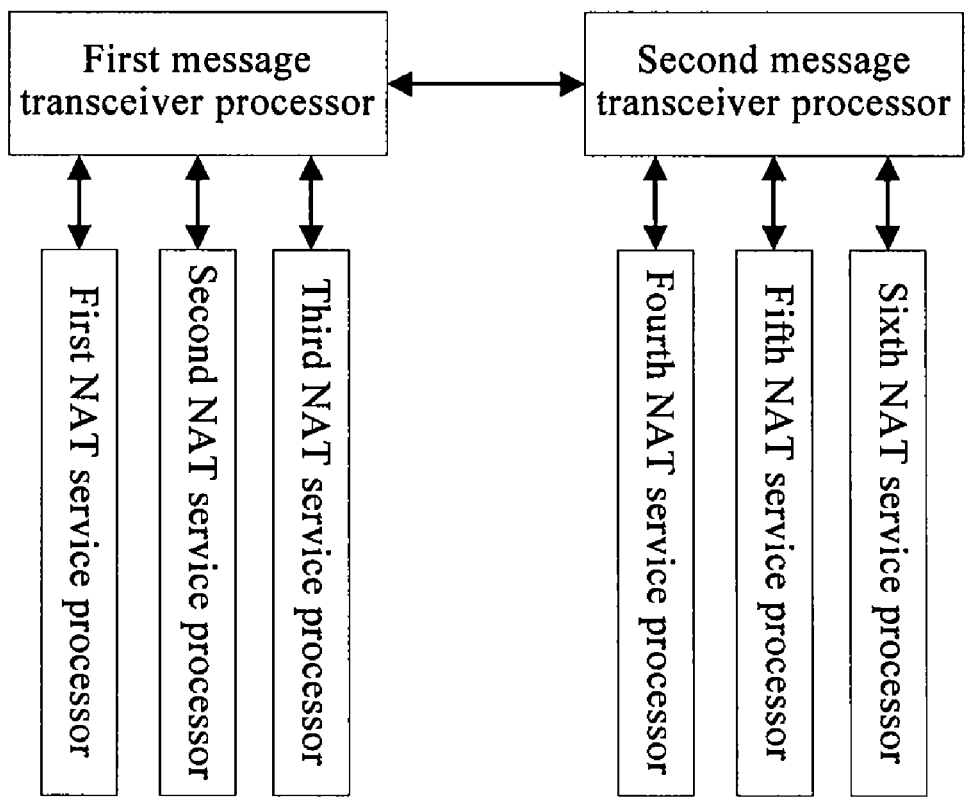
FIG. 7 is a schematic structural diagram of a system according to an embodiment of the disclosure.

In an embodiment, the disclosure further provides a system for processing a NAT service. The processing system includes at least one message transceiver processor and at least two NAT service processors. FIG. 7 is a schematic structural diagram of the system according to an embodiment of the disclosure. As shown in FIG. 7, in this embodiment, the system includes a first message transceiver processor, a second message transceiver processor, a first NAT service processor, a second NAT service processor, a third NAT service processor, a fourth NAT service processor, a fifth NAT service processor, and a sixth NAT service processor. In this embodiment, functions and structures of the first message transceiver processor and the second message transceiver processor are the same with the above message transceiver processor, and thus are not repeated here. Functions and structures of the first NAT service processor, the second NAT service processor, the third NAT service processor, the fourth NAT service processor, the fifth NAT service processor, and the sixth NAT service processor are the same. In order not to repeat the description, in this embodiment, the function and structure of the first NAT service processor is described.

The first NAT service processor is adapted to perform NAT service processing on the message.

Figure 8:
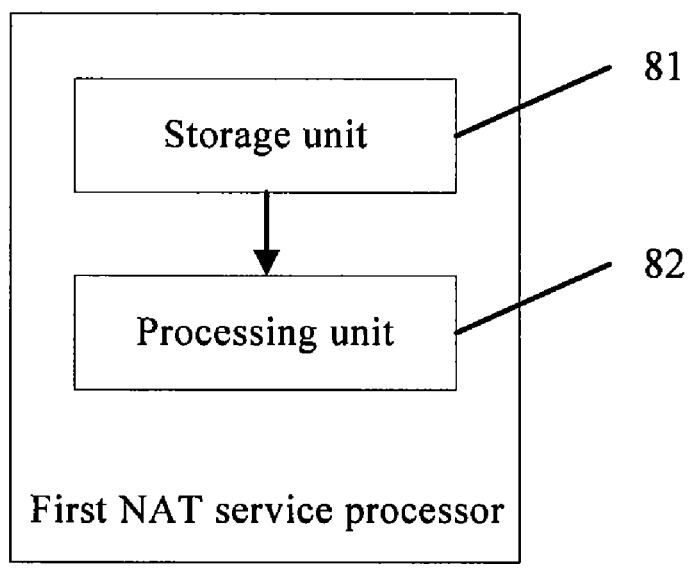
FIG. 8 is a schematic structural diagram of a NAT service processor according to an embodiment of the disclosure.

FIG. 8 is a schematic structural diagram of a NAT service processor according to an embodiment of the disclosure. The specific structure of the first NAT service processor in the system shown in FIG. 7 is as shown in FIG. 8, which includes a storage unit 81 and a processing unit 82.

The storage unit 81 is adapted to store a forwarding entry generated during NAT service processing, and store node information configured by the first message transceiver processor. The node information includes node address information, or port number, or other identifiers. The storage unit 81 is further adapted to store corresponding public network address information and port number, and the like.

The processing unit 82 is adapted to perform NAT service processing on a received message. In this embodiment, the processing unit 82 translates a source address of a forward flow message from an internal network address and port number (and related identifiers) to a public network address and port number (and corresponding identifiers) according to the forwarding entry and the configured node address stored in the storage unit 81 and an external public network address and port number. Alternatively, the processing unit 82 translates a destination address and port number (and related identifiers) of a reverse flow message into an internal network address and port number (and corresponding identifiers). And then, the processing unit 82 returns the message processed by the NAT service processor to the first message transceiver processor.

Optionally, the above first NAT service processor may also include an assistance unit. The assistance unit is adapted to interact information with other NAT service processors, and assist other NAT service processors to accomplish some NAT functions of specific application, including backup of data of other NAT service processors.

The system of NAT in the embodiments of the disclosure may be set in a local area network or other network organizations.

In conclusion, compared with a NAT service being accomplished by an overall system in the prior art, a NAT service being accomplished in a distributed processing manner in a distributed system in the embodiments of the disclosure, in other words, a NAT service being processed by at least one message transceiver processor and at least two NAT service processors in a system may fulfill a demand for the system to process a lot of NAT services within a short time, thereby effectively increasing the capacity of processing NAT services of the system.

It is apparent to those of ordinary skill in the art that all or a part of flows in the methods of the embodiments above may be accomplished by related hardware instructed by computer program. The computer program may be stored in a computer readable storage media. When the program is executed, the flows in the methods of the embodiments may be included. The storage media may be a magnetic disk, an optical disk, a read-only memory (ROM), or a random access memory (RAM), and the like.

The above are merely preferred embodiments of the disclosure, but not intended to limit the scope of the disclosure. It will be apparent to those skilled in the art that various variations and replacements easily conceived without departing from the scope of the disclosure should fall within the scope of the following claims and their equivalents.

What is claimed is:

1. A method for processing a network address translation (NAT) service, comprising:
configuring, by a message transceiver processor, a NAT service processor of at least two NAT service processors for each node inside a local area network according to at least one configuration policy, wherein each of the at least two NAT service processors corresponds to at least one public network address, and the public network addresses corresponding to each of the NAT service processors are different;
generating, by the message transceiver processor, a routing table that stores an address or a number of the NAT service processor that processes a NAT service of a message of the each node;
receiving a message from a node, and then performing NAT service identification on a the received message by the message transceiver processor;
selecting, by the message transceiver processor, a corresponding NAT service processor for processing a NAT service of the received message from the at least two NAT service processors if the received message needs NAT service processing;
sending, by the message transceiver processor, the received message to the corresponding NAT service processor;
performing the NAT service processing on the received message and returning the processed message to the message transceiver processor by the corresponding NAT service processor; and
sending, by the message transceiver processor, the processed message returned by the corresponding NAT service processor.

2. The method for processing a NAT service according to claim 1, wherein the configuration policy comprises at least one of the following:
a first policy of configuration, in accordance with an address of the node inside the local area network;
a second policy of configuration, in accordance with a port number of the node inside the local area network; and
a third policy of configuration, in accordance with an identifier of the node inside the local area network.

3. The method for processing a NAT service according to claim 2, wherein if the configuration policy is configured in accordance with the address of the node inside the local area network, each address pool including internal network addresses of a plurality of nodes is bound to a corresponding NAT service processor, and all the NAT services related to the addresses in the address pool are processed by the corresponding NAT service processor.

4. The method for processing a NAT service according to claim 1, wherein the selecting the corresponding NAT service processor for processing the NAT service of the message comprises:
sending, the received message, which is a forward flow message, from the local area network to a public network;
searching, a corresponding configuration policy, according to the information of the forward flow message;
searching, the address or the number of the corresponding NAT service processor, according to the corresponding configuration policy; and
sending the forward flow message to the corresponding NAT service processor for the NAT service processing.

5. The method for processing a NAT service according to claim 4, wherein the sending the forward flow message to the corresponding NAT service processor for the NAT service processing comprises: translating a source address of the forward flow message from an address inside the local area network into the public network address corresponding to the corresponding NAT service processor, and returning the translated forward flow message.

6. The method for processing a NAT service according to claim 1, wherein the selecting the corresponding NAT service processor for processing the NAT service of the message comprises:
sending, the received message, which is a reverse flow message, from a public network to the local area network;
searching, the address or the number of the corresponding NAT service processor, from the routing table according to the information of the destination address of the reverse flow message; and
sending the reverse flow message to the corresponding NAT service processor for the NAT service processing.

7. The method for processing a NAT service according to claim 6, wherein the sending the reverse flow message to the corresponding NAT service processor for the NAT service processing comprises: translating a destination address of the reverse flow message from the public network address into an address inside the local area network, and returning the translated reverse flow message.

8. A message transceiver processor, comprising:
a configuration unit, configured to store configuration policies, and configure a network address translation (NAT) service processor of at least two NAT service processors for each node inside a local area network according to at least one configuration policy of the configuration policies, wherein each of the at least two NAT service processors corresponds to at least one public network address, and the public network addresses corresponding to each of the NAT service processors are different;
a routing unit, configured to store a routing table generated when the configuration unit configures the NAT service processor of at least two NAT service processors NAT service processor for the each node inside the local area network, wherein the routing table stores an address or a number of the NAT service processor;
a service identification unit, configured to perform NAT service identification on a received message, determine whether the received message needs a NAT service processing, and send the determination result to a processing unit; and
the processing unit, configured to select a corresponding NAT service processor for processing a NAT service of the received message that needs the NAT service processing determined by the NAT service identification unit from at least two NAT service processors, send the received message to the corresponding NAT service processor, and send a message after processing returned by the corresponding NAT service processor.

9. The message transceiver processor according to claim 8, wherein when selecting the corresponding NAT service processor for processing the NAT service of the received message, the processing unit is configured to:
search for a corresponding configuration policy in the configuration unit according to information of a forward flow message and search for the address or the number of the corresponding NAT service processor according to the corresponding configuration policy.

10. The message transceiver processor according to claim 8, wherein when selecting the corresponding NAT service processor for processing the NAT service of the received message, the processing unit is configured to:
- search for the address or the number of the corresponding NAT service processor according to information of a destination address of the reverse flow message from the routing table stored in the routing unit.

11. A system for processing a network address translation (NAT) service, comprising:
- at least two NAT service processors, configured to perform a NAT service processing on a message, wherein each of the at least two NAT service processors corresponds to at least one public network address, and the public network addresses corresponding to each of the NAT service processors are different; and
- a message transceiver processor, configured to perform NAT service identification on a received message, and select a corresponding NAT service processor for processing a NAT service of a message that needs the NAT service processing from the at least two NAT service processors, wherein the message transceiver processor comprises:
- a configuration unit, configured to store configuration policies, and configure a network address translation (NAT) service processor of at least two NAT service processors for each node inside a local area network according to at least one configuration policy of the configuration policies, wherein each of the at least two NAT service processors corresponds to at least one public network address, and the public network addresses corresponding to each of the NAT service processors are different;
- a routing unit, configured to store a routing table generated when the configuration unit configures the NAT service processor of at least two NAT service processors NAT service processor for the each node inside the local area network, wherein the routing table stores an address or a number of the NAT service processor;
- a NAT service identification unit, configured to perform NAT service identification on a received message, determine whether the received message needs a NAT service processing, and send the determination result to a processing unit; and
- the processing unit, configured to select a corresponding NAT service processor for processing a NAT service of the received message that needs the NAT service processing determined by the NAT service identification unit from at least two NAT service processors, send the received message to the corresponding NAT service processor, and send a message after processing returned by the corresponding NAT service processor.

12. The system for processing a NAT service according to claim 11, wherein the NAT service processor comprises:
- a storage unit, configured to store information of a node configured by the message transceiver processor and information of the corresponding public network address; and
- a processing unit, configured to perform the NAT service processing on the received message according to the information stored by the storage unit, and return the message after the NAT service processing to the message transceiver processor.

13. The system for processing a NAT service according to claim 11, wherein when the system comprises at least two message transceiver processors, information is interacted between the message transceiver processors; and the information is interacted between the at least two NAT service processors.

14. The system for processing a NAT service according to claim 13, wherein the message transceiver processor further comprises a delivery unit, configured to deliver the configuration policy in the configuration unit and the routing table stored in the routing unit to other message transceiver processors.

* * * * *

UNITED STATES PATENT AND TRADEMARK OFFICE
CERTIFICATE OF CORRECTION

| | | |
|---|---|---|
| PATENT NO. | : 8,149,840 B2 | |
| APPLICATION NO. | : 12/469359 | |
| DATED | : April 3, 2012 | |
| INVENTOR(S) | : Zhang et al. | |

It is certified that error appears in the above-identified patent and that said Letters Patent is hereby corrected as shown below:

Column 11, line 21, "on a the" should read -- on the --.

Column 12, line 46, after the word "a" the acronym -- NAT -- should be inserted.

Signed and Sealed this
Seventh Day of August, 2012

David J. Kappos
*Director of the United States Patent and Trademark Office*